United States Patent
Lee et al.

(10) Patent No.: US 11,781,010 B2
(45) Date of Patent: Oct. 10, 2023

(54) THERMOPLASTIC RESIN COMPOSITION AND ARTICLE PRODUCED THEREFROM

(71) Applicant: LOTTE CHEMICAL CORPORATION, Seoul (KR)

(72) Inventors: Sang Hoon Lee, Uiwang-si (KR); Tae Gon Kang, Uiwang-si (KR); Eun Taek Woo, Uiwang-si (KR); Da Heen Jeong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 217 days.

(21) Appl. No.: 17/317,248

(22) Filed: May 11, 2021

(65) Prior Publication Data

US 2022/0064438 A1    Mar. 3, 2022

(30) Foreign Application Priority Data

Aug. 27, 2020    (KR) .................. 10-2020-0108314

(51) Int. Cl.

| | |
|---|---|
| *C08L 69/00* | (2006.01) |
| *C08L 51/08* | (2006.01) |
| *C08K 5/42* | (2006.01) |
| *C08L 51/04* | (2006.01) |
| *C08K 3/08* | (2006.01) |

(52) U.S. Cl.
CPC .............. *C08L 69/00* (2013.01); *C08K 3/08* (2013.01); *C08K 5/42* (2013.01); *C08L 51/04* (2013.01); *C08L 51/085* (2013.01); *C08K 2003/0825* (2013.01); *C08L 2201/02* (2013.01)

(58) Field of Classification Search
None
See application file for complete search history.

(56) References Cited

U.S. PATENT DOCUMENTS

| | | | | |
|---|---|---|---|---|
| 6,232,397 B1 * | 5/2001 | Weber | ............... | C08L 69/00 524/145 |
| 2001/0012594 A1 * | 8/2001 | Ri | ............... | G03G 5/0592 430/96 |
| 2002/0115762 A1 * | 8/2002 | Chung | ............... | C08L 69/00 524/161 |
| 2010/0130656 A1 * | 5/2010 | Ikematsu | ............... | C08L 69/00 524/588 |
| 2011/0065848 A1 | 3/2011 | Jung et al. | | |
| 2012/0315418 A1 * | 12/2012 | Nakajima | ............... | G03G 15/2057 428/35.9 |
| 2015/0344670 A1 | 12/2015 | Han et al. | | |
| 2016/0024299 A1 | 1/2016 | Tomita | | |
| 2016/0319127 A1 | 11/2016 | Jeong et al. | | |
| 2016/0326312 A1 | 11/2016 | Park et al. | | |
| 2016/0326313 A1 | 11/2016 | Son et al. | | |
| 2016/0326314 A1 | 11/2016 | Son et al. | | |
| 2016/0326321 A1 | 11/2016 | Park et al. | | |
| 2016/0369047 A1 | 12/2016 | Hwang et al. | | |
| 2016/0369048 A1 | 12/2016 | Park et al. | | |
| 2016/0369095 A1 | 12/2016 | Park et al. | | |
| 2016/0376405 A1 | 12/2016 | Park et al. | | |
| 2017/0137568 A1 | 5/2017 | Chun et al. | | |
| 2017/0158852 A1 | 6/2017 | Ko et al. | | |
| 2017/0190833 A1 | 7/2017 | Hwang et al. | | |
| 2017/0275456 A1 | 9/2017 | Hwang et al. | | |
| 2017/0292019 A1 | 10/2017 | Lee et al. | | |
| 2017/0298221 A1 | 10/2017 | Son et al. | | |
| 2017/0298222 A1 | 10/2017 | Lee et al. | | |
| 2017/0306146 A1 | 10/2017 | Lee et al. | | |
| 2017/0321014 A1 | 11/2017 | Lee et al. | | |
| 2020/0207979 A1 | 7/2020 | Kim et al. | | |

FOREIGN PATENT DOCUMENTS

| | | | |
|---|---|---|---|
| CN | 102027064 A | | 4/2011 |
| CN | 105315640 A | | 2/2016 |
| CN | 106795297 A | | 5/2017 |
| CN | 107880510 | * | 4/2018 |
| CN | 111378268 A | | 7/2020 |
| CN | 112143197 | * | 12/2020 |
| KR | 10-2007-0018283 A | | 2/2007 |

* cited by examiner

*Primary Examiner* — David J Buttner
(74) *Attorney, Agent, or Firm* — Additon, Pendleton & Witherspoon, P.A.

(57) ABSTRACT

A thermoplastic resin composition of the present invention comprises: about 100 parts by weight of a polycarbonate resin; about 1 part by weight to about 5 parts by weight of a silicone-based rubber modified vinyl graft copolymer; and about 0.03 parts by weight to about 0.2 parts by weight of a metallic salt compound; wherein the metallic salt compound comprises a compound represented by the Formula 1, a compound represented by the Formula 2 and/or a compound represented by the Formula 3 as defined herein. The thermoplastic resin composition can have good properties in terms of impact resistance, impact resistance after ultrasonic welding, flame retardancy, heat resistance, and the like.

8 Claims, No Drawings

THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application No. 10-2020-0108314, filed on Aug. 27, 2020, the entire disclosure of which is incorporated herein by reference.

FIELD

The present disclosure relates to a thermoplastic resin composition and a molded article formed of the same.

BACKGROUND

Polycarbonate resins have good properties in terms of impact resistance, rigidity, transparency, thermal stability, self-extinguishability and dimensional stability, and are used as materials for electric/electronic products, automobile parts, and the like.

When a polycarbonate resin composition is used for manufacturing chargers or electric/electronic products, assembly and bonding processes are usually carried out through ultrasonic welding. However, conventional polycarbonate resin compositions suffer from deterioration in mechanical properties such as impact resistance and flame retardancy during ultrasonic welding.

Therefore, there is a need for a thermoplastic resin composition having good properties such as impact resistance, impact resistance after ultrasonic welding, flame retardancy, heat resistance, and the like.

SUMMARY OF THE INVENTION

The present disclosure provides a thermoplastic resin composition which can have good properties in terms of impact resistance, impact resistance after ultrasonic welding, flame retardancy, and the like, and a molded article formed of the same.

The thermoplastic resin composition comprises about 100 parts by weight of a polycarbonate resin; about 1 part by weight to about 5 parts by weight of a silicone-based rubber modified vinyl graft copolymer; and about 0.03 parts by weight to about 0.2 parts by weight of a metallic salt compound; wherein the metallic salt compound comprises a compound represented by the following Formula 1, a compound represented by the following Formula 2 and/or a compound represented by the following Formula 3:

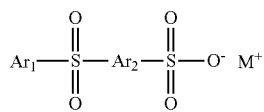

[Formula 1]

wherein $Ar_1$ is a $C_6$ to $C_{12}$ aryl group, $Ar_2$ is a $C_6$ to $C_{12}$ arylene group, and M is Na or K;

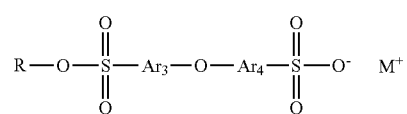

[Formula 2]

wherein R is a $C_8$ to $C_{16}$ alkyl group, $Ar_3$ and $Ar_4$ are each independently a $C_6$ to $C_{12}$ arylene group, and M is Na or K;

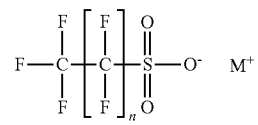

[Formula 3]

wherein M is Na or K and n is an integer from 1 to 10.

The silicone-based rubber modified vinyl graft copolymer may be obtained by graft polymerization of an alkyl(meth)acrylate monomer to a silicone-based rubber polymer.

The metallic salt compound may be a mixture of about 80 wt % to about 95 wt % of the compound represented by the Formula 1 and about 5 wt % to about 20 wt % of the compound represented by the Formula 2.

The metallic salt compound may be the compound represented by the Formula 3.

The silicone-based rubber modified vinyl graft copolymer and the metallic salt compound may be present in a weight ratio of about 5:1 to about 80:1.

The thermoplastic resin composition may have a Notched Izod impact strength of about 55 kgf·cm/cm to about 80 kgf·cm/cm, as measured on a ⅛" thick specimen in accordance with ASTM D256.

The thermoplastic resin composition may have a fracture height of about 40 cm to about 80 cm, as measured on a 1 mm thick specimen using a drop impact tester in accordance with the DuPont drop test by applying an ultrasonic energy at a frequency of 20 KHz on the specimen using an ultrasonic welding machine, and measuring a height, at which dropping a 1 kg dart results in breakage of the specimen.

The thermoplastic resin composition may have a flame retardancy of V-0 or higher, as measured on a 1.5 mm thick specimen in accordance with UL94 vertical test.

The thermoplastic resin composition may have a Vicat softening temperature of about 135° C. to about 150° C., as measured at a heating rate of 50° C./hr under a load of 5 kg in accordance with ISO 306.

The present disclosure also relates to a molded article. The molded article may be formed of the thermoplastic resin composition according to any of the embodiments of the present disclosure.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present disclosure includes: (A) a polycarbonate resin; (B) a silicone-based rubber modified vinyl graft copolymer; and (C) a metallic salt compound.

As used herein to represent a specific numerical range, the expression "a to b" means "≥a and ≤b".

(A) Polycarbonate Resin

The polycarbonate resin according to embodiments of the present disclosure may be a polycarbonate resin used in typical thermoplastic resin compositions. For example, the polycarbonate resin may be an aromatic polycarbonate resin obtained by reacting a precursor, such as phosgene, halogen formate, carbonic diester, and the like, with diphenol(s) (aromatic diol compounds).

Examples of the diphenols may include 4,4'-biphenol, 2,2-bis(4-hydroxyphenyl)propane, 2,4-bis(4-hydroxyphenyl)-2-methylbutene, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and mixtures and/or combinations thereof, without being limited thereto. For example, the diphenols may include 2,2-bis(4-hydroxyphenyl)propane, 2,2-bis(3,5-dichloro-4-hydroxyphenyl)propane, and/or 1,1-bis(4-hydroxyphenyl)cyclohexane, for example 2,2-bis-(4-hydroxyphenyl)propane, which is also referred to as bisphenol A.

The polycarbonate resin may be a branched polycarbonate resin. For example, the polycarbonate resin may be a branched polycarbonate resin obtained by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good fluidity (processability), and the like.

(B) Silicone-Based Rubber Modified Vinyl Graft Copolymer

The silicone-based rubber modified vinyl graft copolymer with the polycarbonate resin and the metallic salt compound may improve impact resistance, impact resistance after ultrasonic welding, flame retardancy, heat resistance, and balance therebetween of the thermoplastic resin composition. The silicone-based rubber modified vinyl graft copolymer may be obtained by graft polymerization of a vinyl monomer such as an alkyl(meth)acrylate monomer to a silicone-based rubber polymer. The polymerization may be performed by any typical polymerization method, such as emulsion polymerization, suspension polymerization, and the like. In addition, the silicone-based rubber modified vinyl graft copolymer may form a core (silicone-based rubber polymer)-shell (polymer of the vinyl monomer) structure.

The silicone-based rubber polymer may be prepared by polymerizing a rubbery monomer including a silicone-based monomer such as cyclosiloxane. Examples of the cyclosiloxane may include hexamethylcyclotrisiloxane, octamethylcyclotetrasiloxane, decamethylcyclopentasiloxane, dodecamethylcyclohexasiloxane, trimethyl triphenyl cyclotrisiloxane, tetramethyl tetraphenyl cyclotetrasiloxane, octaphenylcyclotetrasiloxane, and the like, and mixtures and/or combinations thereof, without being limited thereto. The silicone-based rubber polymer can also include a crosslinking agent. Examples of the crosslinking agent can include trimethoxymethylsilane, triethoxyphenylsilane, tetramethoxysilane, tetraethoxysilane and the like, and mixtures and/or combinations thereof, without being limited thereto. Examples of the silicone-based rubber polymer may include without limitation polydimethylsiloxane (PDMS) rubbery polymer, and the like.

The silicone-based rubber polymer (rubber particle) may have an average particle diameter (D50) of about 30 nm to about 200 nm, for example, about 50 nm to about 100 nm, measured by a particle size analyzer, and the silicone-based rubber modified vinyl graft copolymer may have an average particle diameter (D50) of about 100 nm to about 300 nm, for example, about 150 nm to about 250 nm, measured by a particle size analyzer. Within this range, the thermoplastic resin composition may have good properties in terms of impact resistance, impact resistance after ultrasonic welding, external appearance, and the like. As used herein, the average particle diameter can be measured using techniques and equipment known in the art, for example, by a dry dispersion method using a Mastersizer 2000E series (Malvern). The skilled artisan will understand the meaning of the term average particle diameter described herein and how to measure the same. For example, the skilled artisan will understand that the term D50 refers to a median value (wherein half of the particles in a sample are larger than D50 and half are smaller than D50) reported on a volume basis (distribution) measured, for example, using laser diffraction.

Examples of the vinyl monomer may include alkyl(meth)acrylate monomer, aromatic vinyl monomer, and the like, and mixtures and/or combinations thereof, without being limited thereto.

The alkyl(meth)acrylate monomer is a monomer graft copolymerizable with the rubber polymer. As used herein, the term alkyl can include C1 to C10 alkyl. Examples of the alkyl(meth)acrylate monomer may include, for example, methyl (meth)acrylate, ethyl (meth)acrylate, propyl (meth)acrylate, butyl (meth)acrylate, epoxy group-containing alkyl (meth)acrylate monomer such as glycidyl (meth) acrylate, and the like, without being limited thereto. These may be used alone or as a mixture thereof.

The aromatic vinyl monomer is a monomer graft-copolymerizable with the rubber copolymer. Examples of the aromatic vinyl monomer may include, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, without being limited thereto. These may be used alone or as a mixture thereof.

The silicone-based rubber modified vinyl graft copolymer may be a graft copolymer in which alkyl(meth)acrylate monomer such as butyl acrylate and/or methyl methacrylate are graft polymerized onto a silicone-based rubber polymer.

The silicone-based rubber modified vinyl graft copolymer may include the silicone-based rubber polymer in an amount of about 3 to about 40 wt %, for example, about 5 to about 30 wt %, and the vinyl monomer in an amount of about 60 to about 97 wt %, for example, about 70 to about 95 wt %, each based on 100 wt % of the silicone-based rubber modified vinyl graft copolymer.

In some embodiments, the silicone-based rubber modified vinyl graft copolymer may include the silicone-based rubber polymer in an amount of about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %, based on 100 wt % of the silicone-based rubber modified vinyl graft copolymer. Further, according to some embodiments, the silicone-based rubber polymer can be present in an amount of from about any of the foregoing amounts to about any other of the foregoing amounts.

In some embodiments, the silicone-based rubber modified vinyl graft copolymer may include the vinyl monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, or 97 wt %, based on 100 wt % of the silicone-based rubber modified vinyl graft copolymer. Further, according to some embodiments, the vinyl monomer can be present in an amount of from about any of the foregoing amounts to about any other of the foregoing amounts.

Within these ranges, the thermoplastic resin composition can have good properties in terms of impact resistance, impact resistance after ultrasonic welding, and the like.

The thermoplastic resin composition may include the silicone-based rubber modified vinyl graft copolymer in an amount of about 1 part by weight to about 5 parts by weight, for example, about 2 parts by weight to about 4 parts by weight, relative to about 100 parts by weight of the polycarbonate resin. In some embodiments, the thermoplastic resin composition may include the silicone-based rubber modified vinyl graft copolymer in an amount of about 1, 2, 3, 4, or 5 parts by weight, based on about 100 parts by weight of the polycarbonate resin. Further, according to some embodiments, the silicone-based rubber modified vinyl graft copolymer can be present in an amount of from about any of the foregoing amounts to about any other of the foregoing amounts.

If the amount of the silicone-based rubber modified vinyl graft copolymer is less than about 1 part by weight, the thermoplastic resin composition can suffer from deterioration in impact resistance, impact resistance after ultrasonic welding, and the like. If the amount of the silicone-based rubber modified vinyl graft copolymer is more than about 5 parts by weight, flame retardancy and heat resistance of the thermoplastic resin composition could be deteriorated.

(C) Metallic Salt Compound

The metallic salt compound with the polycarbonate resin and the silicone-based rubber modified vinyl graft copolymer may serve to improve impact resistance, impact resistance after ultrasonic welding, flame retardancy, heat resistance, and balance therebetween of the thermoplastic resin composition. The metallic salt compound comprises a compound represented by the following Formula 1, a compound represented by the following Formula 2 and/or a compound represented by the following Formula 3:

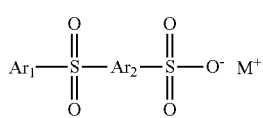

[Formula 1]

wherein $Ar_1$ is a $C_6$ to $C_{12}$ aryl group, $Ar_2$ is a $C_6$ to $Cu$ arylene group, and M is Na or K;

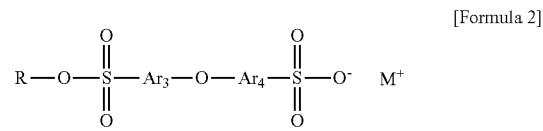

[Formula 2]

wherein R is a $C_8$ to $C_{16}$ alkyl group, $Ar_3$ and $Ar_4$ are each independently a $C_6$ to $C_{12}$ arylene group, and M is Na or K;

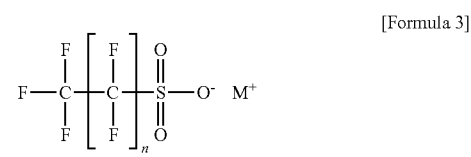

[Formula 3]

wherein M is Na or K and n is an integer from 1 to 10.

Examples of the compound represented by the Formula 1 may include without limitation potassium 3-(phenylsulfonyl)benzenesulfonate, potassium diphenyl sulfone sulfonate, and the like, and mixtures and/or combinations thereof.

Examples of the compound represented by the Formula 2 may include without limitation sodium dodecyl diphenyl ether disulfonate, and the like, and mixtures and/or combinations thereof.

Examples of the compound represented by the Formula 3 may include without limitation potassium perfluorobutane sulfonate, and the like, and mixtures and/or combinations thereof.

In some embodiments, the metallic salt compound may be a mixture of about 80 wt % to about 95 wt %, for example, about 85 wt % to about 95 wt %, of the compound represented by the Formula 1 and about 5 wt % to about 20 wt %, for example, about 5 wt % to about 15 wt %, of the compound represented by the Formula 2.

In some embodiments, the metallic salt compound may include the compound represented by the Formula 1 in an amount of about 80, 81, 82, 83, 84, 85, 86, 87, 88, 89, 90, 91, 92, 93, 94, or 95 wt %, based on 100 wt % of the metallic salt compound. Further, according to some embodiments, the compound represented by the Formula 1 can be present in an amount of from about any of the foregoing amounts to about any other of the foregoing amounts.

In some embodiments, the metallic salt compound may include the compound represented by the Formula 2 in an amount of about 5, 6, 7, 8, 9, 10, 11, 12, 13, 14, 15, 16, 17, 18, 19, or 20 wt %, based on 100 wt % of the metallic salt compound. Further, according to some embodiments, the compound represented by the Formula 2 can be present in an amount of from about any of the foregoing amounts to about any other of the foregoing amounts.

Within these ranges, the thermoplastic resin composition may have further improved properties in terms of impact resistance, impact resistance after ultrasonic welding, and the like.

In some embodiments, the metallic salt compound may be the compound represented by the Formula 3.

The thermoplastic resin composition may include the metallic salt compound in an amount of about 0.03 parts by weight to about 0.2 parts by weight, for example, about 0.05 parts by weight to about 0.15 parts by weight, relative to about 100 parts by weight of the polycarbonate resin. In some embodiments, the thermoplastic resin composition may include the metallic salt compound in an amount of about 0.03, 0.04, 0.05, 0.06, 0.07, 0.08, 0.09, 0.1, or 0.2 parts by weight, based on about 100 parts by weight of the polycarbonate resin. Further, according to some embodiments, the metallic salt compound can be present in an amount of from about any of the foregoing amounts to about any other of the foregoing amounts.

If the amount of the metallic salt compound is less than about 0.03 parts by weight, the thermoplastic resin composition can suffer from deterioration in flame retardancy. If the amount of the metallic salt compound is more than about 0.2 parts by weight, impact resistance, the thermoplastic resin composition can suffer from deterioration in impact resistance, impact resistance after ultrasonic welding, flame retardancy and heat resistance.

The silicone-based rubber modified vinyl graft copolymer (B) and the metallic salt compound (C) may be present in a weight ratio (B:C) of about 5:1 to about 80:1, for example, about 10:1 to about 60:1. In some embodiments, the silicone-based rubber modified vinyl graft copolymer (B) and the metallic salt compound (C) may be present in a weight ratio (B:C) of about 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, or 80:1. Further, according to some embodiments, the silicone-based rubber modified vinyl graft copolymer (B) and the metallic salt compound (C) may be present in a weight ratio (B:C) of from about any of the foregoing ratios to about any other of the foregoing ratios.

Within this range, the thermoplastic resin composition can have further improved properties in terms of impact resistance, impact resistance after ultrasonic welding, flame retardancy, heat resistance, and balance therebetween.

The thermoplastic resin composition may further optionally include one or more additives used in typical thermoplastic resin compositions. Examples of the additives may include an anti-dripping agent, a lubricant, a nucleating agent, a stabilizer, a release agent, pigments, dyes, and the like, and mixtures thereof, without being limited thereto. The additives may be present in an amount of about 0.001 to about 40 parts by weight, for example, about 0.1 to about 10 parts by weight, relative to about 100 parts by weight of the polycarbonate resin.

The thermoplastic resin composition may be prepared in pellet form by mixing the aforementioned components, followed by melt extrusion using a typical twin-screw extruder at about 200° C. to about 280° C., for example, about 220° C. to about 270° C.

The thermoplastic resin composition may have a Notched Izod impact strength of about 55 kgf·cm/cm to about 80 kgf·cm/cm, for example, about 60 kgf·cm/cm to about 75 kgf·cm/cm, as measured on a ⅛" thick specimen in accordance with ASTM D256. In some embodiments, the thermoplastic resin composition may have a Notched Izod impact strength of about 55, 56, 57, 58, 59, 60, 61, 62, 63, 64, 65, 66, 67, 68, 69, 70, 71, 72, 73, 74, 75, 76, 77, 78, 79, or 80 kgf·cm/cm. Further, according to some embodiments, the thermoplastic resin composition may have a Notched Izod impact strength of from about any of the foregoing to about any other of the foregoing.

The thermoplastic resin composition may have a fracture height of about 40 cm to about 80 cm, for example, about 40 to about 60 cm, as measured on a 1 mm thick specimen using a drop impact tester in accordance with the DuPont drop test by applying an ultrasonic energy at a frequency of 20 KHz on the specimen for 0.1 second to 0.3 seconds using an ultrasonic welding machine, and measuring a height, at which dropping a 1 kg dart results in breakage of the specimen. In some embodiments, the thermoplastic resin composition may have a fracture height of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 cm. Further, according to some embodiments, the thermoplastic resin composition may have a fracture height of from about any of the foregoing to about any other of the foregoing.

The thermoplastic resin composition may have a flame retardancy of V-0 or higher, as measured on a 1.5 mm thick specimen in accordance with UL94 vertical test.

The thermoplastic resin composition may have a Vicat softening temperature of about 135° C. to about 150° C., for example, about 138° C. to about 145° C., as measured at a heating rate of 50° C./hr under a load of 5 kg in accordance with ISO 306. In some embodiments, the thermoplastic resin composition may have a Vicat softening temperature of about 135, 136, 137, 138, 139, 140, 141, 142, 143, 144, 145, 146, 147, 148, 149, or 150° C. Further, according to some embodiments, the thermoplastic resin composition may have a Vicat softening temperature of from about any of the foregoing temperatures to about any other of the foregoing temperatures.

A molded article according to the present disclosure can be formed of the thermoplastic resin composition set forth herein. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles may exhibit good properties in terms of impact resistance, impact resistance after ultrasonic welding, flame retardancy, heat resistance, and balance therebetween, and thus may be useful without limitation as an interior and/or exterior material for electric and/or electronic products, an interior and/or exterior material for automobiles, an exterior material for construction, and the like, which are assembled and bonded through ultrasonic welding.

Next, the present invention will be described in more detail with reference to the following examples. It should be understood that these examples are provided for illustration only and are not to be in any way construed as limiting the present invention.

EXAMPLES

Details of each component used in Examples and Comparative Examples are as follows:

(A) Polycarbonate Resin

A bisphenol-A polycarbonate resin (weight average molecular weight: 22,000 g/mol) is used.

(B) Rubber Modified Vinyl Graft Copolymer Resin (B1) A silicone-based rubber modified vinyl graft copolymer (Manufacturer: Mitsubishi Chemical, Product Name: Metablen S-2100) obtained by graft polymerization of acrylic monomer (Butyl Acrylate/Methyl Methacrylate) to silicone-based rubber polymer (PDMS) is used.

(B2) g-ABS obtained by graft polymerization of 55 wt % of a monomer mixture of styrene and acrylonitrile (styrene/acrylonitrile: 75 wt %/25 wt %) to 45 wt % of butadiene rubber having a Z-average particle diameter of 310 nm is used.

(C) Metallic Salt Compound (C1) A mixture of 90 wt % of potassium 3-(phenylsulfonyl)benzenesulfonate and 10 wt % of sodium dodecyl diphenyl ether disulfonate is used.

(C2) Potassium perfluorobutane sulfonate is used.

(C3) Lithium trifluoromethane sulfonate ($CF_3SO_3^-Li^+$) is used.

Example 1 to 8 and Comparative Example 1 to 8

The aforementioned components are mixed in amounts as listed in Tables 1 and 2, followed by extrusion at 270° C., thereby preparing a thermoplastic resin composition in pellet form. Here, extrusion is performed using a twin-screw extruder (L/D: 36, Φ: 45 mm). The prepared pellets are dried at 100° C. for 4 hours or more and then subjected to injection molding using a 10 oz injection machine (molding temperature: 300° C.), thereby preparing a specimen. The prepared specimen is evaluated as to the following properties. Results are shown in Tables 1 and 2.

Property Evaluation (1) Impact resistance: Notched Izod impact strength (unit: kgf·cm/cm) is measured on a ⅛" thick Izod specimen in accordance with ASTM D256.

(2) Impact resistance after ultrasonic welding: An ultrasonic energy at a frequency of 20 KHz is applied on a 1 mm thick specimen for 0.1 to 0.3 seconds using an ultrasonic welding machine (Manufacturer: Branson, Product Name: 2000Xc), followed by measurement of a height (unit: cm), at which dropping a 1 kg dart resulted in breakage of the specimen, using a drop impact tester in accordance with the DuPont drop test.

(3) Flame retardancy: Flame retardancy is measured on a 1.5 mm thick specimen in accordance with the UL-94 vertical test.

(4) Heat resistance: Vicat softening temperature (VST) (unit: ° C.) is measured at a heating rate of 50° C./hr under a load of 5 kg in accordance with ISO 306.

TABLE 1

| | Examples | | | | | | | |
|---|---|---|---|---|---|---|---|---|
| | 1 | 2 | 3 | 4 | 5 | 6 | 7 | 8 |
| (A) (parts by weight) | 100 | 100 | 100 | 100 | 100 | 100 | 100 | 100 |
| (B1) (parts by weight) | 2 | 2.5 | 4 | 2.5 | 2.5 | 2.5 | 2.5 | 2.5 |
| (B2) (parts by weight) | — | — | — | — | — | — | — | — |
| (C1) (parts by weight) | 0.08 | 0.1 | 0.15 | 0.05 | 0.15 | — | — | — |
| (C2) (parts by weight) | — | — | — | — | — | 0.08 | 0.12 | 0.2 |
| (C3) (parts by weight) | — | — | — | — | — | — | — | — |
| Notched Izod impact strength (kgf · cm/cm) | 62 | 66 | 69 | 68 | 65 | 65 | 66 | 65 |
| Fracture height (cm) | 42 | 45 | 46 | 46 | 44 | 45 | 46 | 43 |
| Flame retardancy | V-0 | V-0 | V-0 | V-0 | V-0 | V-0 | V-0 | V-0 |
| VST (° C.) | 143 | 143 | 141 | 144 | 142 | 140 | 139 | 138 |

TABLE 2

| | Comparative Examples | | | | | | | |
|---|---|---|---|---|---|---|---|---|
| | 1 | 2 | 3 | 4 | 5 | 6 | 7 | 8 |
| (A) (parts by weight) | 100 | 100 | 100 | 100 | 100 | 100 | 100 | 100 |
| (B1) (parts by weight) | 0.5 | 6 | — | 2.5 | 2.5 | 2.5 | 2.5 | 2.5 |
| (B2) (parts by weight) | — | — | 2.5 | — | — | — | — | — |
| (C1) (parts by weight) | 0.08 | 0.2 | 0.15 | 0.01 | 0.4 | — | — | — |
| (C2) (parts by weight) | — | — | — | — | — | 0.01 | 0.4 | — |
| (C3) (parts by weight) | — | — | — | — | — | — | — | 0.2 |
| Notched Izod impact strength (kgf · cm/cm) | 41 | 62 | 52 | 64 | 34 | 64 | 34 | 56 |
| Fracture height (cm) | 35 | 47 | 47 | 45 | 34 | 45 | 34 | 47 |
| Flame retardancy | V-0 | V-2 | V-2 | V-2 | V-2 | V-2 | V-2 | V-2 |
| VST (° C.) | 143 | 133 | 135 | 140 | 132 | 140 | 132 | 139 |

From the above results, it can be seen that the thermoplastic resin composition according to the present disclosure has good properties in terms of impact resistance, impact resistance after ultrasonic welding, flame retardancy, heat resistance, and balance therebetween.

Conversely, it can be seen that the composition of Comparative Example 1 prepared using a smaller amount of the silicone-based rubber modified vinyl graft copolymer suffers from deterioration in impact resistance, impact resistance after ultrasonic welding, and the like; the composition of Comparative Example 2 prepared using an excess of the silicone-based rubber modified vinyl graft copolymer suffers from deterioration in flame retardancy, heat resistance, and the like; the composition of Comparative Example 3 prepared using g-ABS (B2) instead of the silicone-based rubber modified vinyl graft copolymer suffers from deterioration in impact resistance, flame retardancy, and the like. Further, the compositions of Comparative Example 4 and Comparative Example 6 prepared using a small amount of the metallic salt compound suffer from deterioration in flame retardancy and the like; the compositions of Comparative Example 5 and Comparative Example 7 prepared using an excess of the metallic salt compound suffer from deterioration in impact resistance, impact resistance after ultrasonic welding, flame retardancy, heat resistance, and the like; and the composition of Comparative Example 8 prepared using metallic salt compound (C3) instead of the metallic salt compound of the present disclosure suffers from deterioration in flame retardancy, and the like.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

It is within the scope of this disclosure for one or more of the terms "substantially," "about," "approximately," and/or the like, to qualify each adjective and adverb of the foregoing disclosure to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

For example, all numerical values provided throughout this disclosure can be approximate, and for each range specified in this disclosure, all values within the range and all subranges within the range are also disclosed. Approximate values can be calculated, and it is believed that each value can vary by plus or minus about 25%, plus or minus about 20%, plus or minus about 15%, plus or minus about 10%, plus or minus about 5%, plus or minus about 1%, or less than about 1%, including all values and subranges therebetween for each of the above ranges.

The use of the term "and/or" includes any and all combinations of one or more of the associated listed items.

What is claimed is:

1. A thermoplastic resin composition comprising:
about 100 parts by weight of a polycarbonate resin;
about 1 part by weight to about 5 parts by weight of a silicone-based rubber modified vinyl graft copolymer; and
about 0.03 parts by weight to about 0.2 parts by weight of a metallic salt compound;
wherein the metallic salt compound is a mixture of about 80 wt % to about 95 wt % of a compound represented by the following Formula 1 and about 5 wt % to about 20 wt % of a compound represented by the following Formula 2:

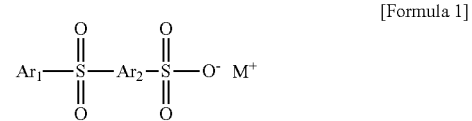

[Formula 1]

wherein $Ar_1$ is a $C_6$ to $C_{12}$ aryl group, $Ar_2$ is a $C_6$ to $C_{12}$ arylene group, and M is Na or K;

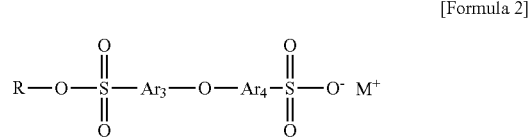

[Formula 2]

wherein R is a $C_8$ to $C_{16}$ alkyl group, $Ar_3$ and $Ar_4$ are each independently a $C_6$ to $C_{12}$ arylene group, and M is Na or K.

2. The thermoplastic resin composition according to claim 1, wherein the silicone-based rubber modified vinyl graft copolymer is obtained by graft polymerization of an alkyl (meth)acrylate monomer to a silicone-based rubber polymer.

3. The thermoplastic resin composition according to claim 1, wherein the silicone-based rubber modified vinyl graft copolymer and the metallic salt compound are present in a weight ratio of about 5:1 to about 80:1.

4. The thermoplastic resin composition according to claim 1, wherein the thermoplastic resin composition has a Notched Izod impact strength of about 55 kgf·cm/cm to about 80 kgf·cm/cm, as measured on a ⅛" thick specimen in accordance with ASTM D256.

5. The thermoplastic resin composition according to claim 1, wherein the thermoplastic resin composition has a fracture height of about 40 cm to about 80 cm, as measured on a 1 mm thick specimen using a drop impact tester in accordance with the DuPont drop test by applying an ultrasonic energy at a frequency of 20 KHz on the specimen using an ultrasonic welding machine, and measuring a height, at which dropping a 1 kg dart results in breakage of the specimen.

6. The thermoplastic resin composition according to claim 1, wherein the thermoplastic resin composition has a flame retardancy of V-0 or higher, as measured on a 1.5 mm thick specimen in accordance with UL94 vertical test.

7. The thermoplastic resin composition according to claim 1, wherein the thermoplastic resin composition has a Vicat softening temperature of about 135° C. to about 150° C., as measured at a heating rate of 50° C./hr under a load of 5 kg in accordance with ISO 306.

8. A molded article formed of the thermoplastic resin composition according to claim 1.

* * * * *